(12) United States Patent  (10) Patent No.: US 7,817,925 B2
Honda et al.  (45) Date of Patent: Oct. 19, 2010

(54) HIGH-SPEED DISPERSION COMPENSATION CONTROL APPARATUS

(75) Inventors: Toshiki Honda, Kawasaki (JP); Kazuhiro Kunimatsu, Kawasaki (JP); Takeshi Ono, Kawasaki (JP); Katsumi Fukumitsu, Kawasaki (JP); Masakazu Ozaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 487 days.

(21) Appl. No.: 11/567,354

(22) Filed: Dec. 6, 2006

(65) Prior Publication Data

US 2007/0297804 A1    Dec. 27, 2007

(30) Foreign Application Priority Data

Jun. 27, 2006  (JP)  ............................. 2006-176998

(51) Int. Cl.
  *H04B 10/06*  (2006.01)
(52) U.S. Cl. ....................................... 398/209; 398/159
(58) Field of Classification Search ................ 398/208, 398/209, 159
  See application file for complete search history.

(56) References Cited

U.S. PATENT DOCUMENTS

| 5,717,510 | A | 2/1998 | Ishikawa et al. |
| 5,754,322 | A | 5/1998 | Ishikawa et al. |
| 5,760,937 | A | 6/1998 | Ishikawa et al. |
| 5,815,294 | A | 9/1998 | Ishikawa et al. |
| 5,870,213 | A | 2/1999 | Ishikawa et al. |
| 5,896,217 | A | 4/1999 | Ishikawa et al. |
| 5,909,297 | A | 6/1999 | Ishikawa et al. |
| 5,991,477 | A | 11/1999 | Ishikawa et al. |
| 2003/0002112 | A1* | 1/2003 | Hirano et al. ............... 359/161 |
| 2003/0007216 | A1 | 1/2003 | Chraplyvy et al. |
| 2004/0213578 | A1* | 10/2004 | Takahara et al. ............ 398/147 |
| 2004/0223769 | A1 | 11/2004 | Hoshida |
| 2007/0047964 | A1* | 3/2007 | Ooi et al. ..................... 398/147 |
| 2007/0189779 | A1* | 8/2007 | Murphy et al. .............. 398/187 |

FOREIGN PATENT DOCUMENTS

| GB | 2 370 473 | 6/2002 |
| JP | 8-321805 | 12/1996 |
| JP | 2000-115077 | 4/2000 |
| JP | 2003-60580 | 2/2003 |
| WO | WO 02/51041 A2 | 6/2002 |

* cited by examiner

*Primary Examiner*—Nathan M Curs
(74) *Attorney, Agent, or Firm*—Staas & Halsey LLP

(57) ABSTRACT

An optical signal, which is a low-speed signal superimposed on a high-speed phase modulated optical signal by intensity modulation, is used. In an optical receiver apparatus 40, a received signal is split, and one of the split signals is O/E converted and low frequency component alone is extracted via a filter 46. A clock is extracted from low-frequency component by CDR, and is compared with a preset frequency. Using the frequency difference obtained, dispersion compensation is performed with low accuracy. Next, the amount of phase control of the delay interferometer 21 is adjusted so that the amplitude of the electrical signal is maximized. An error rate is measured, and fine adjustment is performed to improve the error rate.

11 Claims, 8 Drawing Sheets

HIGH-SPEED DISPERSION COMPENSATION CONTROL APPARATUS

BACKGROUND OF THE INVENTION

1. Field of the Invention

The present invention relates to an optical transmission system, and particularly to a dispersion compensation control apparatus in an optical transmission system employing optical phase modulation and demodulation.

2. Description of the Related Art

In recent years, there have been increasing demands for introduction of a 40 Gb/s optical transmission system of the next generation, and transmission distance and frequency usage efficiency equivalent to a 10 Gb/s system have additionally been sought in the 40 Gb/s system. As means for realizing the system, research and development of RZ-DPSK (Return to Zero-Differential Phase Shift Keying) modulation and CSRZ (Carrier Suppressed Return to Zero)-DPSK modulation, which excel in an optical signal-to-noise ratio (OSNR) tolerance and nonlinear tolerance compared with NRZ (Non Return to Zero) modulation employed in the conventional systems with 10 Gb/s or less, have been opened up. In addition to the above modulations, research and development of phase modulation method such as RZ-DQPSK or CSRZ-DQPSK (Differential Quadrature Phase Shift Keying) modulation having the characteristics of narrow spectrum (high-frequency use efficiency), has also become active. Here, the RZ-DQPSK modulation is a modulation method applying RZ intensity modulation to DQPSK-modulated light, and the CSRZ-DQPSK modulation is a modulation method, when applying RZ intensity modulation to DQPSK-modulated light, for generating an RZ signal with a carrier having narrowed spectrum range by contriving the phase.

Figure 1A:
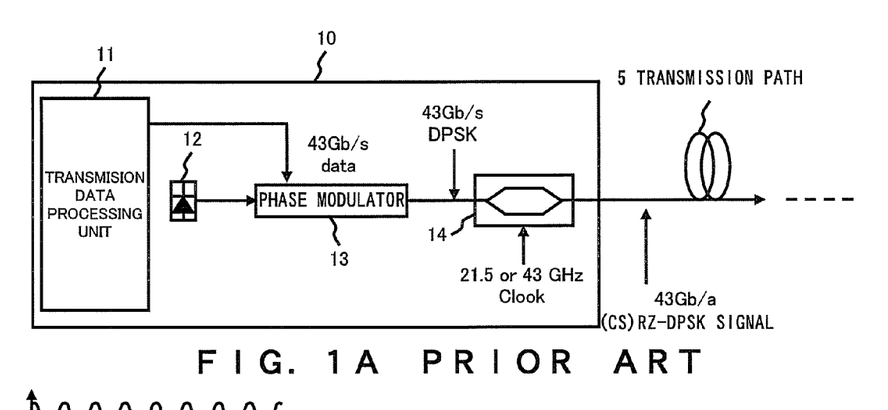
FIGS. 1A-1C are diagrams showing the conventional optical transmitter apparatus and the conventional optical receiver apparatus.
Figures 1B, 1C:
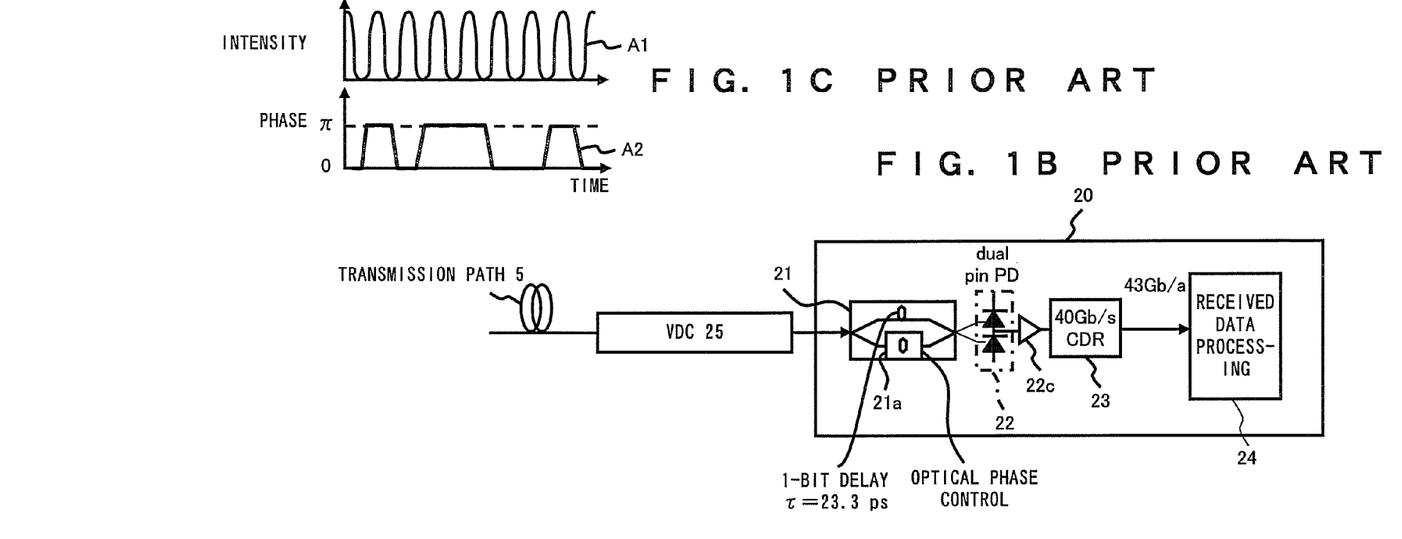

FIGS. 1A through 1C are diagrams showing an optical transmitter apparatus for transmitting optical signals employing 43 Gb/s RZ-DPSK or CSRZ-DPSK modulation method, and an optical receiver apparatus for performing receiving processing such as demodulation of the optical signals modulated by the RZ-DPSK or CSRZ-DPSK modulation.

In a case of transmitting/receiving optical signals by the RZ-DPSK or the CSRZ-DPSK modulation method, the optical intensity is 43 GHz clock waveform, and information is carried by binary optical phase.

An optical transmitter apparatus 10 shown in FIG. 1A comprises a transmission data processing unit 11, a CW (Continuous Wave) optical source 12, a phase modulator 13, and an RZ-pulsing intensity modulator 14. The transmission data processing unit 11 comprises a function as a DPSK pre-coder for performing coding, reflecting information of difference between the current code and the 1-bit previous code, in addition to a function as a framer for framing the input data and a function as an FEC (Forward Error Correction) encoder for adding error correction codes.

The phase modulator 13 modulates continuous wave from the CW optical source 12 by coding data from the transmission data processing unit 11, and outputs an optical signal with constant optical intensity, carrying information on the binary optical phase, that is a DPSK modulated optical signal. Furthermore, the RZ-pulsing intensity modulator 14 performs RZ-pulsing of the optical signal from the phase modulator 13. In other words, as shown in FIG. 1C, when the phase-modulated optical signal is in the state shown as A2, separately from this phase modulation, an optical signal shown as A1, which is RZ intensity-modulated with the same frequency as the bit rate (43 GHz), is generated. Particularly, an optical signal, which is RZ-pulsed by using a frequency being the same as the bit rate (43 GHz) and a clock driving signal having amplitude as much as extinction voltage (Vπ), is referred to as an RZ-DPSK signal, and an optical signal, which is RZ-pulsed by using a frequency half of the bit rate (21.5 GHz) and a clock driving signal having amplitude twice as much as the extinction voltage (Vπ), is referred to as an CSRZ-DPSK signal.

In addition, an optical receiver apparatus 20 in FIG. 1B is connected to the optical transmitter apparatus 10 via a transmission path 5, and performs the received signal processing of the (CS)RZ-DPSK signal, and the apparatus comprises a delay interferometer 21, an O/E converter unit 22, a Clock Data Recovery (CSR) 23, and a received data processing unit 24.

The delay interferometer 21 comprises a Mach-Zehnder interferometer, for example, and causes interference (delay interference) between a 1-bit time delay component (23.3 ps in this case) of the (CS)RZ-DPSK signal transmitted via the transmission path 5 and a 0-rad phase-controlled component. As a result of the interference, two outputs are obtained. In other words, one of the split waveguides having the Mach-Zehnder interferometer is formed so as to be longer by the propagation length corresponding to the 1-bit time than the other split waveguide, and comprises an electrode 21a for phase control of the optical signal propagated in the other split waveguide.

The O/E converter unit 22 comprises dual pin photodiodes for performing balanced detection by receiving each of the two outputs from the above delay interferometer 21. Note that, the received signal detected in the above O/E converter unit 22 is amplified appropriately by an amplifier 22c. CDR 23 extracts a data signal and a clock signal from the received signal detected by the balanced detection in the O/E converter unit 22. Based on the data signal and the clock signal extracted in CDR 23, signal processing such as error correction is performed in the received data processing unit 24.

As other technologies relating to the present invention, there are technologies described in the following Patent Documents 1-5.

[Patent Document 1]

U.S. Patent Application Publication No. 2004-0223769

[Patent Document 2]

Japanese Patent Application Publication No. 08-321805

[Patent Document 3]

Japanese Patent Application Publication No. 2000-115077

[Patent Document 4]

Japanese Patent Application Publication No. 2003-60580

[Patent Document 5]

Japanese Patent Application Publication No. 2004-516743

The above optical receiver apparatus, however, may require highly precise dispersion compensation by placing a variable chromatic dispersion compensator (VDC) 25 in the receiver end, as shown in FIG. 1B, because in 40 Gb/s or 43 Gb/s transmission, the wavelength dispersion tolerance becomes one-sixteenth of the tolerance in the 10 Gb/s transmission.

In such a case, the optical receiver apparatus needs to have optimal setting of the amount of dispersion compensation in VDC, in addition to optimal setting of the phase control in the delay interferometer. That is, in order to receive the (CS)RZ-D(Q) PSK modulated optical signal, the optimal settings of both delay interferometer and VDC are required in order to demodulate the modulated optical signal.

In view of the above point, for dispersion compensation, it is assumed that the number of errors is monitored by error correction number etc. of the decoded received signal, and the VDC is controlled based on the monitored number of errors. However, the relation with the number of errors are different between the characteristics of the amount of dispersion compensation and the characteristics of the amount of phase control by the nature. At the initial setting, because the amount of control is not at the optimal value in both of the delay interferometer and VDC, relatively long time is required in order to find the amount of control, which is optimal for both devices and to improve the quality of the received signal, posing a problem for prompt stabilization of the amount of control of the delay interferometer and of VDC.

In other words, by the optical phase control in the above delay interferometer and the control of the amount of dispersion compensation by VDC, the above number of errors changes, and therefore, it is difficult to stabilize the amounts of control of the both devices immediately after the initial device start-up.

Additionally, since the optical phase difference may fluctuate in the transmission path wavelength dispersion and the delay interferometer due to the terminal changes during the system operation, adaptive control of the delay interferometer and VDC is required. In the technologies described in Patent Documents 1-5 and other conventional art, such a combination of controls in the delay interferometer and VDC of the phase modulation method had not been investigated.

Figure 2:
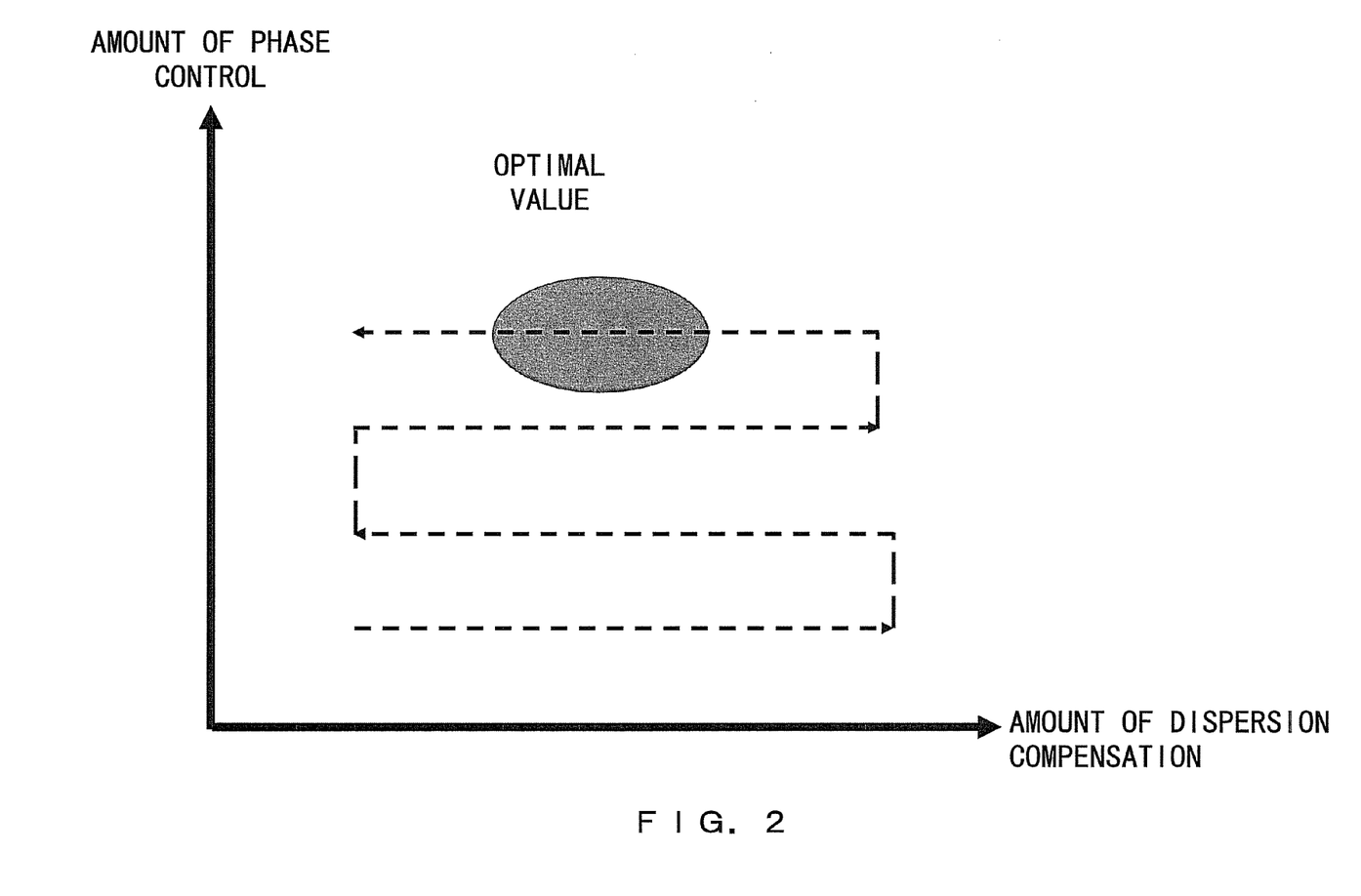
FIG. 2 is a diagram showing a concept of obtaining the optimal value in a case of performing the adjustment of the amount of phase control and the adjustment of the amount of dispersion compensation at the same time in the conventional configuration.

FIG. 2 is a diagram showing a concept of obtaining the optimal value in a case of performing the adjustment of the amount of phase control and the adjustment of the amount of dispersion compensation at the same time in the conventional configuration.

As shown in FIG. 2, in the conventional configuration, adjustment of the amount of phase control after adjusting the amount of dispersion compensation is repeated so as to gradually approach to the optimal value. However, as is clear from FIG. 2, in terms of the amount of dispersion compensation, for example, a control fluctuates between the higher and lower values centering on an optimal value, and it is considered as repeating wasted motions in order to find the optimal value. By so doing, during the process of optimizing both of the amount of dispersion compensation and the amount of phase control, wasted motions are increased, preventing the prompt setting of optimal value of the amount of dispersion compensation and the amount of phase control.

SUMMARY OF THE INVENTION

It is an object of the present invention to provide a dispersion compensation control apparatus, which enables optimal setting of a delay interferometer and a variable wavelength dispersion compensator in the optical receiver apparatus simultaneously and efficiently at initial setting (system operation start, protection, switching paths) and during the system operation.

The dispersion compensation control apparatus of one aspect of the present invention for receiving an optical signal with a predetermined frequency, which is phase-modulated light applied with intensity modulations lower in the modulation speed than the phase modulation with a predetermined frequency, comprising a variable dispersion compensation unit, which can vary an amount of dispersion compensation, for performing dispersion compensation of the optical signal, a clock recovery unit for extracting an intensity modulation component from the received optical signal and for recovering a clock from the extracted intensity modulation component, a comparison unit for comparing a frequency of the recovered clock with the predetermined frequency, a demodulation unit for demodulating the phase modulated optical signal, and for calculating an error rate of a demodulation result, and a dispersion compensation amount control unit, based on the comparison result, for controlling an amount of dispersion compensation of the variable dispersion compensation unit so that the difference in the frequency of the clock becomes small, and afterward for controlling an amount of dispersion compensation of the variable dispersion compensation unit so that the error rate becomes small.

In previous times, approximately 10 minutes are required for optimization at the initial setting (system operation start, protection, switching paths etc.); however, according to the present invention, the required time can be reduced to approximately 1 minute by the dispersion compensation control unit. Although increase in the detection unit results in increase in the cost and scale, the present invention overcomes technical hurdles by using a low-speed signal as a test signal, and realizes speed-up of the control only by adding an inexpensive and small-scale circuit.

DESCRIPTION OF THE PREFERRED EMBODIMENTS

In the embodiment of the present invention, a differential M-ary phase shift keying optical signal with M=2n where n is a natural number is superimposed with a signal with slower speed than the optical signal, and a signal is generated and transmitted to the optical receiver apparatus via a transmission path. The optical receiver apparatus comprises a variable dispersion compensation unit for performing dispersion compensation of the received optical signal in a variable manner, and a clock signal extraction unit for splitting the optical signal from the variable dispersion compensation unit, inputting the signal to each of a balanced detection unit and a delay interferometer unit for performing processing of delay interferometer, and extracting a clock signal by extracting a low-speed signal superimposed in the balanced detection alone by a filter. The amount of dispersion compensation in the variable dispersion compensation unit is roughly controlled based on the clock signal extracted in the clock signal extraction unit. At the same time, the optical receiver apparatus, for performing balanced detection of the optical signal from the delay interferometer, further comprises a balanced detection unit for performing the differential balanced detection of the optical signal from the delay interferometer unit and for outputting a demodulated electrical signal for the differential M-ary phase shift keying, a clock signal extraction unit for extracting a clock signal from the demodulated electrical signal, and an error monitor for detecting the number of errors from the demodulated electrical signal of the differential balanced detection, and controls the amount of dispersion compensation in the variable dispersion compensation unit in accordance with the number of errors in the error monitor. It is also possible to control the variable dispersion compensation unit in accordance with the number of errors in the error monitor during the normal operation of the optical receiver apparatus.

The optical receiver apparatus comprises an error monitor for detecting the number of errors from the demodulated electrical signal from the balanced detection unit. At the operation start-up of the optical receiver apparatus, the dispersion compensation control unit controls the variable dispersion compensation unit based on the clock signal, and after starting the control against the variable dispersion compensation unit, the processing of the delay interferometer is controlled by the delay interferometer control unit. It is also possible to control the variable dispersion compensation unit in accordance with the number of errors by the error monitor during the normal operation of the optical receiver apparatus.

In the following description, the embodiments of the present invention are set forth with reference to the drawings.

Figure 3A:
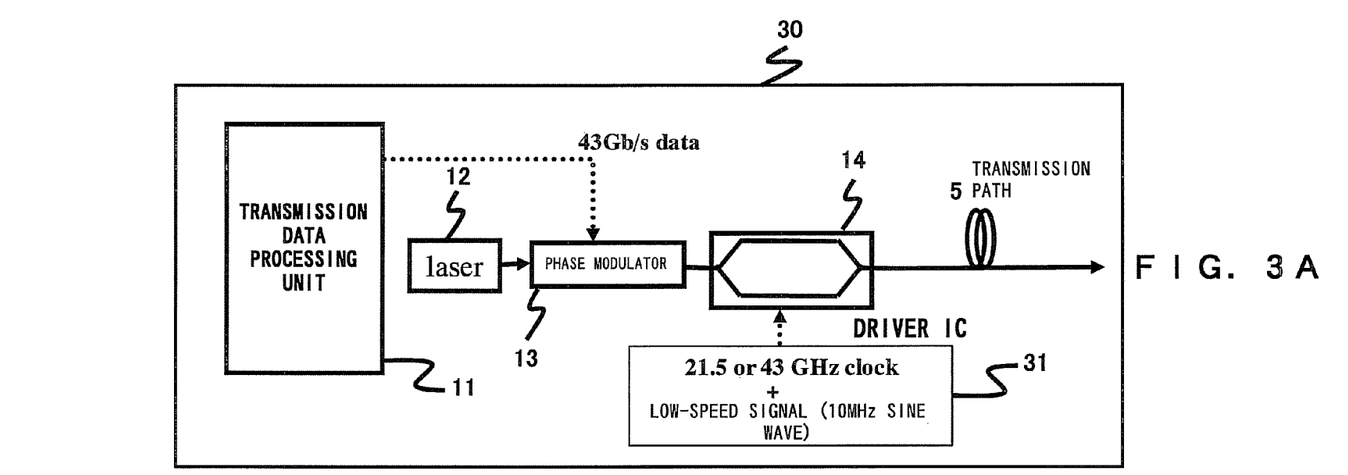
FIGS. 3A-3C are diagrams showing the optical transmitter apparatus relating to the embodiment of the present invention.
Figure 3B:
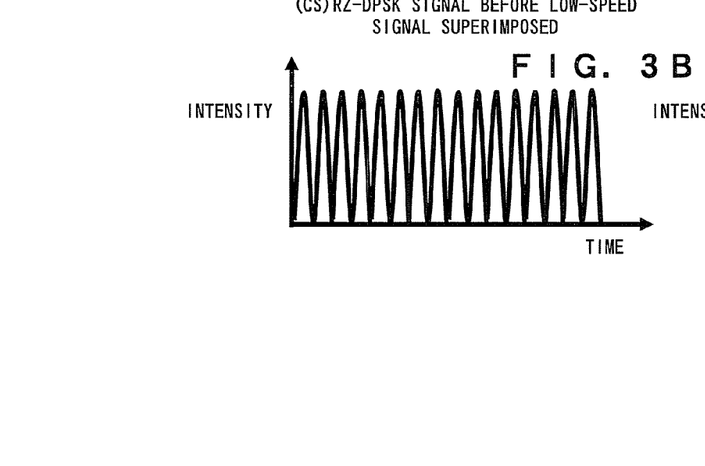
Figure 3C:
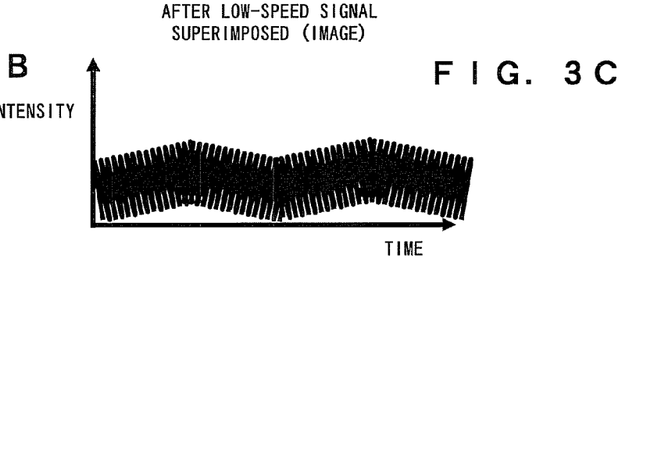

FIGS. 3A through 3C are diagrams showing an optical transmitter apparatus relating to the embodiments of the present invention.

The optical transmitter apparatus 30 shown in FIG. 3A employs (CS) RZ-DPSK modulation/demodulation method, which is differential binary phase shift keying, and it is a modification of the optical receiver apparatus 10 shown in FIG. 1B.

Figure 4:
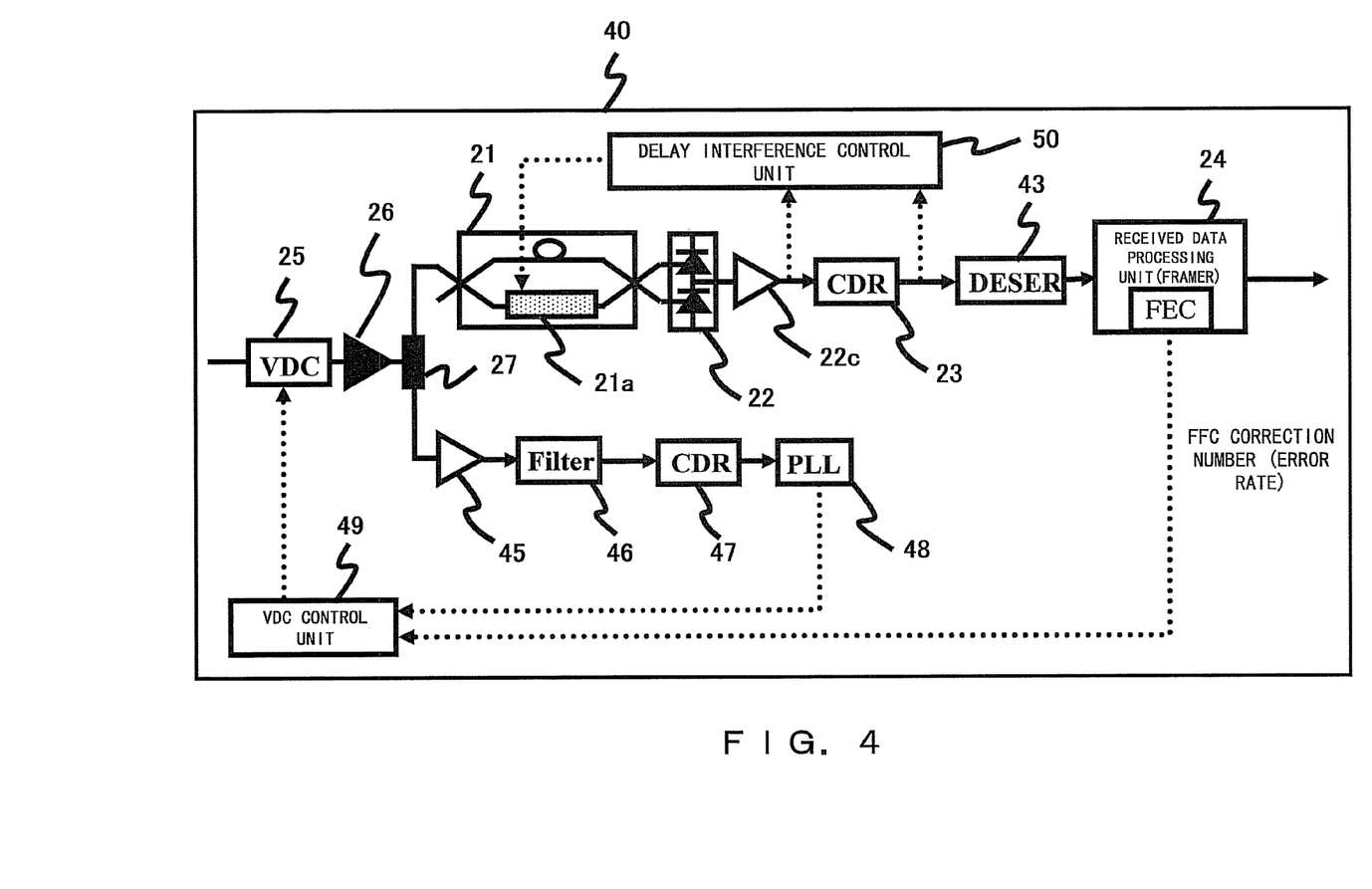
FIG. 4 is a block diagram showing the optical receiver apparatus relating to the embodiment of the present invention.

FIG. 4 is a block diagram showing the optical receiver apparatus relating to the embodiments of the present invention.

An optical receiver apparatus 40 shown in FIG. 4 employs (CS)RZ-DPSK modulation/demodulation method, which is differential binary modulation, and it is a modification of the optical receiver apparatus 20 shown in FIG. 1B.

It should be noted that in FIGS. 3A-3C and FIG. 4, the same components as FIGS. 1A-1C are assigned with the same numeral references, and the explanation is omitted.

In the present optical transmitter/receiver apparatus, an M-ary phase shift keying can be employed in the same manner as the differential binary phase shift keying for modulating light, and if this is the case, in the receiver side, the optical signal is split after VDC, and the VDC can be controlled using a low-speed signal in the same manner as the differential binary phase shift keying.

In the same manner as in a case of the optical transmitter apparatus 10 shown in FIG. 1A, in the optical transmission apparatus 30 shown in FIG. 3A comprises a laser optical source 12, a phase modulator 13, and an RZ-pulsing intensity modulator 14. The light from the laser optical source 12 is modulated by the coded data from the transmission data processing unit 11, and as shown in A1 and A2 of FIG. 1C, the DPSK modulation and the RZ-pulsing by the RZ-pulsing intensity modulator 14 are performed on the light. At that time, an RZ-pulsing clock superimposed with a low-speed signal (e.g. a 10 MHz sine wave) is input to the RZ-pulsing intensity modulator 14 from a driver IC 31 for driving the RZ-pulsing intensity modulator 14. The RZ-pulsing clock before being superimposed with the low-speed signal is, as shown in FIG. 3B, a signal, which changes its intensity at high speed. When the low-speed signal is superimposed on the signal, the modulated signal shapes like an RZ-phase shift keying signal on the low-speed signal as shown in FIG. 3C.

In FIG. 4, similarly with the case of the optical receiver apparatus 20 shown in FIG. 1B, the delay interferometer 21 of the optical receiver apparatus 40 shown in FIG. 4 is a delay interference unit for performing delay interference processing of the optical signal from VDC (Variable Dispersion Compensator) 25 for performing dispersion compensation. In other words, the optical signal from VDC 25, after being amplified by an optical amplifier 26, is split by a coupler 27, and is input to the delay interferometer 21. The delay interferometer 21 is configured so as to split the input optical signal, while delaying one of the split signals for 1-bit, to give the other a phase with the amount of optical phase control $\Delta\phi$, and to have the split component delayed for 1-bit interfere with the split component, the phase of which is shifted by the amount of optical phase control $\Delta\phi$. For normal optical signal reception, the above amount of optical phase control (or simply the amount of phase control) must be set at an optimal value.

The O/E converter unit 22 comprising a dual pin photodiode is a differential balanced detection unit for outputting the demodulated electrical signal of the differential binary phase shift keying signal by performing the differential balanced detection of the optical signal from the delay interferometer 21.

In addition, the clock data recovery (CDR) 23 comprises a function for extracting a data signal as well as a function as a clock signal extraction unit for extracting a clock signal from the demodulated electrical signal from the O/E converter unit 22. A deserializer 43 converts the serial signal sent from CDR 23 into parallel signals. A received data processing unit 24 comprises a function as an error correction processing unit (error monitor) for performing error processing based on the recovery data signal obtained from the demodulated electrical signal from the O/E converter unit 22 and a function as a framer. Based on the FEC error number obtained at this point, a VDC control unit 49 can control the amount of dispersion compensation of VDC 25. The VDC control unit 49, as described later, additionally controls the amount of dispersion compensation information determined from PLL (Phase Locked Loop) 48 based on the low-speed signal. In a case of controlling VDC 25 by voltage, for example, in the VDC control unit 49, control information from both sides are represented by difference in voltage, and the sum of the two are transmitted to VDC 25 as the control amount.

VDC 25 of the present optical receiver apparatus functions as a various dispersion compensation unit for variably performing dispersion compensation of the received optical signal, and VIPA described in a document "IEICE transactions B E85-b_2_463, 40-Gb/s WDM Automatic Dispersion Compensation with Virtually Imaged Phased Array (VIPA) Variable Dispersion Compensators, February 2002" may be employed. Note that the optical signal from VDC 25 is amplified appropriately via the optical amplifier 26, and passed to the delay interferometer 21 and a balanced detector 45 in the optical coupler 27. The balanced detector 45 is for extracting the low-speed signal, and only requires input power within receivable range. For example, given that the optical power distribution ratio in the optical coupler 27 is the delay interferometer 21: the balanced detector 45=10:1; however, the power required for reception of the balanced detector 45 and the delay interferometer 21 alone is needed to be obtained.

The signal detected in the balanced detector 45 has its low-speed signal extracted by passing through the filter 46, and clock extraction is performed in the clock signal extraction unit 47 (practically CDR). The clock is compared with a frequency (e.g. 10 MHz) set as the low-speed signal in PLL 48, and the frequency difference is extracted as correction information, and the correction information is passed to the VDC control unit 49. The VDC control unit 49, based on the correction information, adjusts the amount of dispersion compensation of VDC 25. The correction information is represented by voltage difference for example. A loop from VDC 25 involving PLL 48 and the VDC control unit 49 is a feedback loop for performing dispersion compensation. The filter 46 is a lowpass filter, and extracts the low-speed signals alone. The low-speed signal is an intensity-modulated signal superimposed on a high-speed RZ-phase modulated signal, and therefore, the signal output from the filter 46 is low-speed intensity-modulated signal. By processing the signal using CDR 47 and extracting the clock, a signal with a frequency according to the disturbance of the low-speed signal waveform is extracted. When the amount of dispersion compensation of VDC 25 is not appropriate, the waveform disturbance caused in the low-speed signal is input to CDR 47 without correction, and therefore, a frequency component different from the frequency of the low-speed signal superimposed in the transmission side is extracted. By comparing the frequency component with the frequency of the low-speed signal superimposed in the transmission side, which was set in PLL 48, the frequency difference of the clock signal is generated in accordance with the difference in the amount of dispersion compensation from the optimal value of VDC 25. When this frequency difference is input to the VDC control unit 49, the VDC control unit 49 converts the difference into the control voltage for VDC 25 and provides the voltage to VDC 25. The frequency of the low-speed signal should be preset at the designing of the optical communication system. Note that the accuracy of the amount of dispersion compensation performed in such a manner is low for it is performed using the low-speed signal, the fine adjustment of the amount of dispersion compensation required for normally demodulating the high-speed phase modulation is performed based on the error rate (FEC correction number) obtained in the received data processing unit (framer) 24. In other words, whether or not the error rate improves by slightly oscillating the amount of dispersion compensation of VDC 25 is determined, and control to change the amount of dispersion compensation is performed in a direction where the error rate improved.

First, a delay interference control unit 50 and the VDC control unit 49 of the optical receiver apparatus 40 shown in FIG. 4 are explained. The delay interference control unit 50 monitors at least one of the demodulated electrical signal output from the O/E converter unit 22 and the output signal from CDR 23, and detects the optical intensity of the optical signal after interfered with the component delayed for 1 bit in the delay interferometer 21. In accordance with the monitoring result, the voltage to be provided to the electrode 21a is varied, and the optical phase difference (the amount of phase control) $\Delta\phi$ provided to the optical signal in the delay interferometer 21 is controlled so as to be stabilized at 0°, for example. The output from the O/E converter unit 22 has more undisturbed waveforms as the amount of phase control becomes more appropriate in the delay interferometer 21, and the amplitude tends to be larger. The output of CDR 23, also, has a tendency of having larger amplitude as the amplitude of the demodulated electrical signal becomes large. Consequently, the delay interference control unit 50 monitors any of the demodulated electrical signal or the output signal of CDR 23, and adjusts the amount of phase control so that the amplitude is maximized.

The delay interference control unit 50, for example, may comprise a squaring circuit, a monitor unit, and a phase control amount control circuit. The squaring circuit receives an input of a part of the demodulated electrical signal output from the O/E converter unit 22 via a splitter, and squares the demodulated electrical signal. The monitor unit, by integrating the squared signals from the squaring circuit, obtains the average value. In addition, the phase control amount control circuit, in accordance with the average value obtained from the monitor unit, controls the amount of phase control of the delay interferometer 21. In a case that a Mach-Zehnder interferometer constitutes the delay interferometer 21, the phase of the optical signal can be controlled by supplying a magnetic field via the electrode 21a formed in the optical waveguide part propagating the optical signal, the phase of which is to be controlled.

Figure 5:
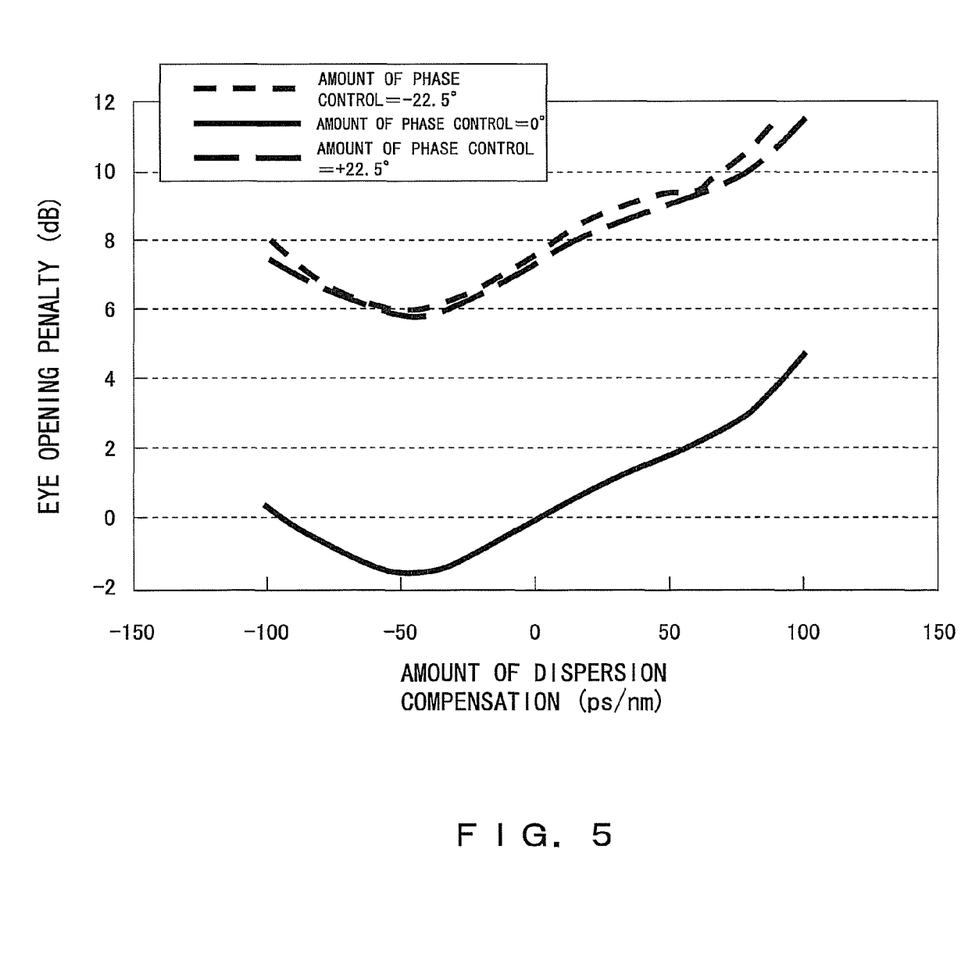
FIG. 5 is a diagram showing the relation between the amount of dispersion compensation, the amount of phase control and an eye opening penalty.

FIG. 5 is a diagram showing the relation between the amount of dispersion compensation, the amount of phase control and an eye opening penalty.

In VDC 25, the error rate of the received data processing unit 24 is required to be adjusted to optimal in the end. In the M-ary phase modulation, as shown in FIG. 5, unless both of the amount of phase control and the amount of dispersion compensation are at their optimal value, the eye opening penalty value is unfavorable, and original signal quality cannot be obtained. However, in order to make the two values to be the optimal value, as described in FIG. 2, in the conventional manner, operation to shift the optical phase of the delay interferometer has to be repeated, seeking an optimal dispersion value.

The embodiments of the present invention performs dispersion compensation of the deterioration of a test signal (low-speed signal) due to dispersion, specifies the rough amount of dispersion compensation first, and at the same time or later, corrects by fine dispersion compensation, using a M-ary phase modulated signal. Note that in FIG. 5, the eye opening penalty is the lowest in a case that the amount of phase control is 0°, because this case assumes that the delay interferometer does not have any external influence. When the delay interferometer is influenced by the external temperature and pressure etc., the optimal value of the amount of phase control can be other than 0°. Hence, the adjustment of the amount of phase control, which is a problem of the present invention, is needed.

Figure 6:
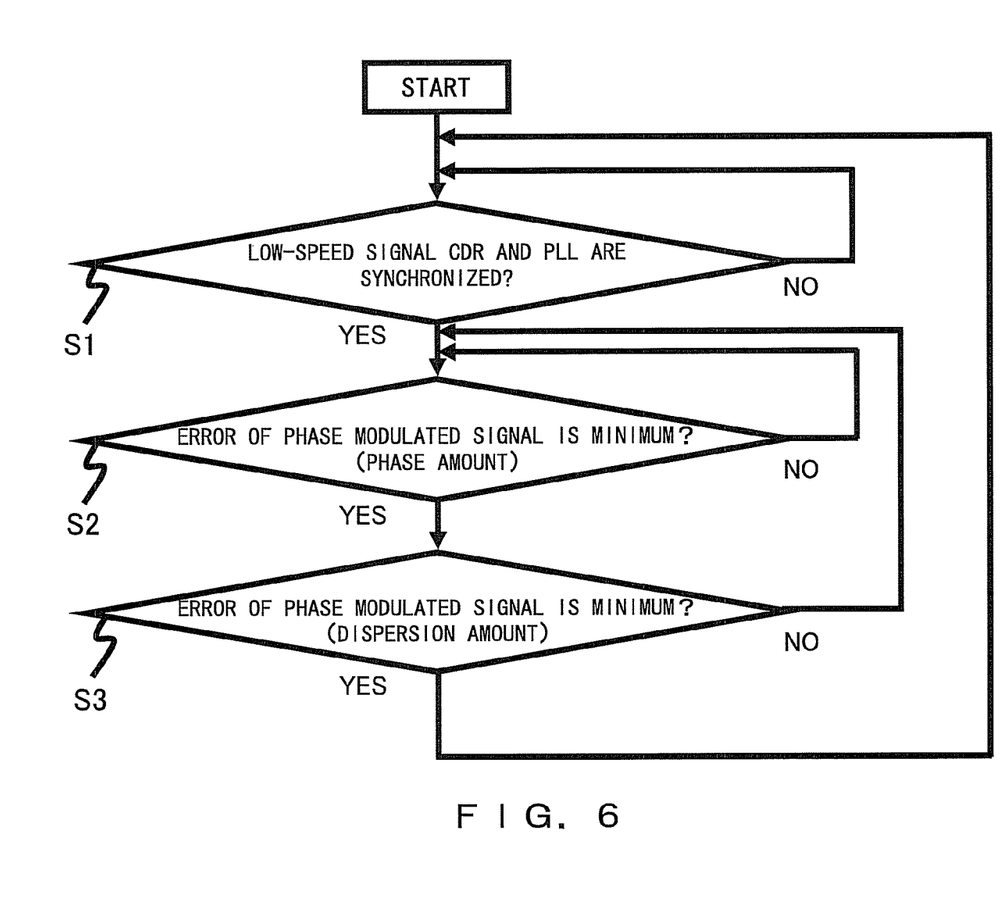
FIG. 6 is a flowchart (1) showing the flow of the processing according to the embodiments of the present invention.
Figure 7:
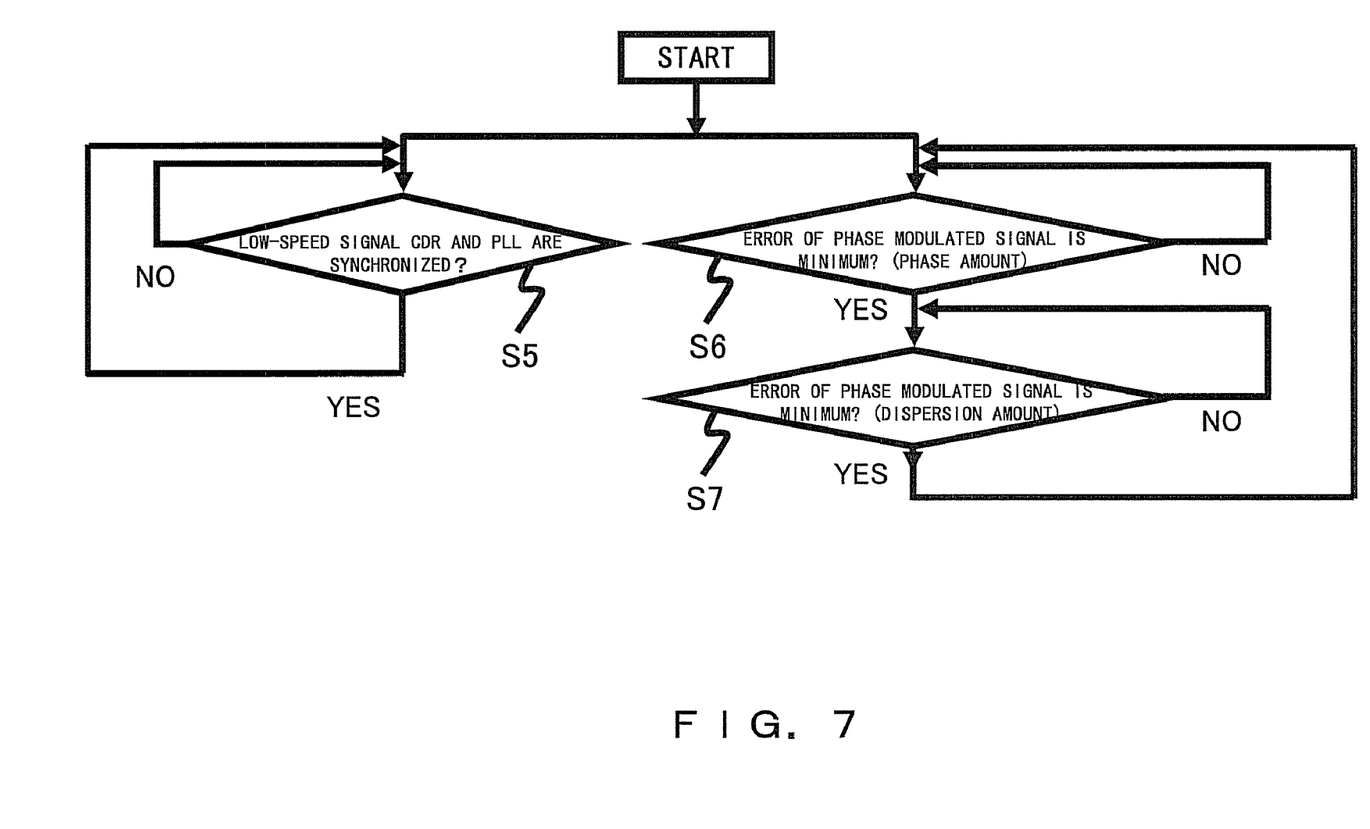
FIG. 7 is a flowchart (2) showing the flow of the processing according to the embodiments of the present invention.

FIG. 6 and FIG. 7 are flowcharts showing the flow of the processing according to the embodiments of the present invention.

FIG. 6 shows the flow of the processing of the first embodiment. In step S1, clock of the low-speed signal is extracted and feedback control is performed in PLL until frequency synchronization is finished. This operation is the operation to roughly narrow down the amount of dispersion compensation. In steps S2 and S3, next, a point such that the FEC correction number of the received data processing unit 24 becomes minimum is sought in the order of the amount of phase control and the amount of dispersion compensation. The amount of dispersion requires fine adjustment, and therefore it is to be adjusted in unit of 5 ps/nm, for example. This adjustment amount has an optimal range varying according to the receiver and modulation conditions, and therefore, the change in accordance with the conditions is required. The system start-up is completed at this point; however, by returning to step S1, the adjustment is continued during the system operation. By so doing, fine adjustment can be conducted even during the system operation. The signals handled in steps S1, S2, and S3 are all different signals, and also the control ranges are all different from each other, and thus, it is possible to control them simultaneously.

For example, it is possible to adjust in the same manner as in FIG. 7. In S5, clock is extracted from the test signal (low-speed signal), and loop control is conducted in PLL until synchronization is finished in the same manner as FIG. 6. At the same time, in S6 and S7, a point where the signal error is minimum is sought using a main signal (RZ-phase modulated signal). The control of the amount of dispersion compensation at that time may be a control with accuracy of approximately +a several tens ps/nm; however, in step S7, the influence on controls of each other is small and simultaneous controls are possible since the adjustment is conducted in the range of 5 ps/nm. In other words, even if the dispersion amount is optimally set in the control of step S5, it is a several tens ps/nm order, and therefore, if fine adjustment in 5 ps/nm order is conducted in step S7, it should fall within the optimal conditions of the control in step S5. Thus, the control in step S5 seeking the optimal value and the control in step S7 also seeking the optimal value are conducted independently from each other, a dispersion compensation value, which satisfies both, can be found.

Figure 8:
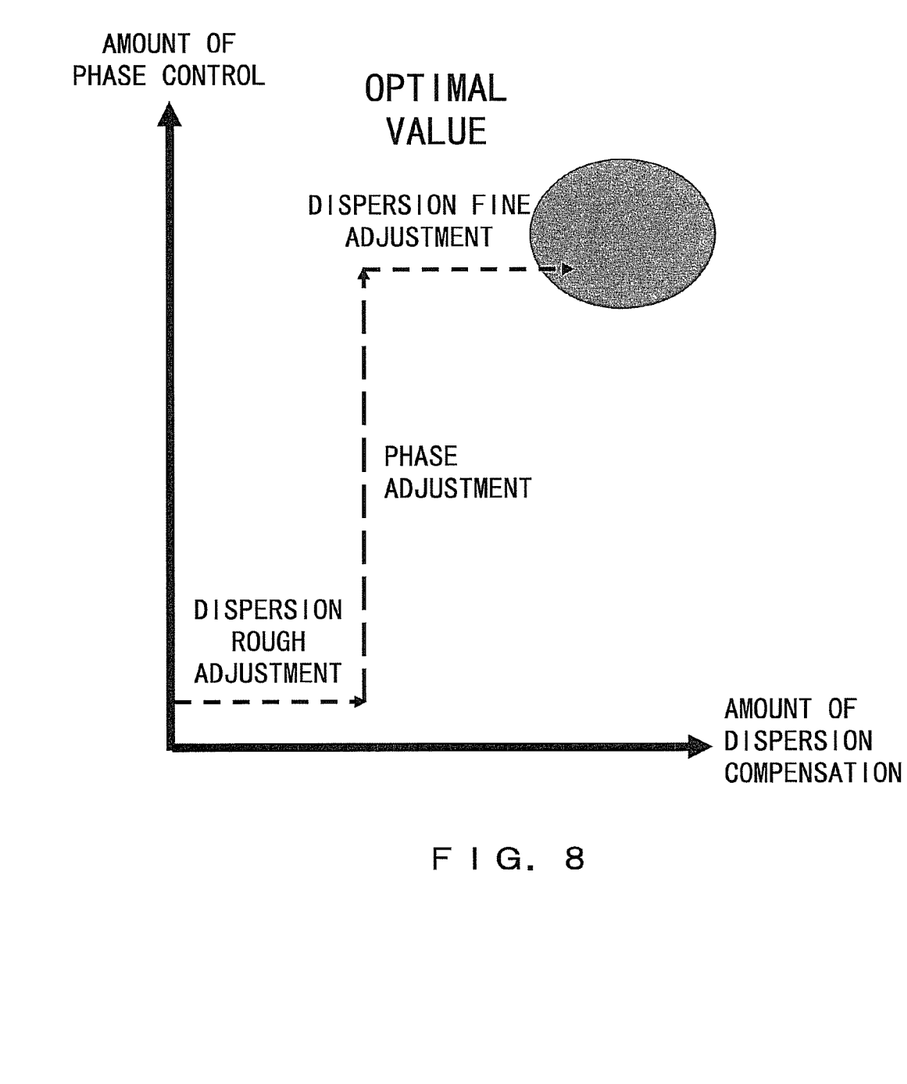
FIG. 8 is a diagram conceptually showing the operation of the control of the amount of phase control and the amount of dispersion compensation according to the embodiments of the present invention.

FIG. 8 is a diagram conceptually showing the operation of the control of the amount of phase control and the amount of dispersion compensation according to the embodiments of the present invention.

The above control enables, by repeating the control during the service operation in addition to the system start-up, readjustment at restarting etc. of a transmitter apparatus, a repeater apparatus in addition to the fine adjustment due to the temperature change etc. By such processing, the control described in FIG. 2 can be changed to as described in FIG. 8, enabling to attain the optimal value by the most direct way without the waste of operation, and thus the time required to attain the optimal values of the amount of phase control and the amount of dispersion compensation can be reduced.

The present invention is not to be limited by the above embodiments but is to be construed as encompassing various modifications without departing from the gist of the present invention.

For example, in the above embodiments, details of an optical receiver apparatus by differential binary phase modulation are described; however, according to the present invention, an optical receiver apparatus by differential M-ary phase modulation where n is a natural number of 2 or above is applicable in the similar manner.

Based on the above disclosure of the embodiments, a person skilled in the art should be able to make the apparatus of the present invention.

It should be noted that in the above description, two examples are explained as the orders of the control; however various orders of the control are possible. The followings are the examples of the possible control orders.

A: rough adjustment of dispersion compensation

B: fine adjustment of dispersion compensation

C: phase adjustment (described as A→B when performed in series and AB when performed simultaneously)

1. A→B→C
2. A→C→B
3. AB→C
4. A→BC
5. B→A→C
6. B→C→A
7. B→AC
8. BC→A
9. C→A→B
10. C→B→A
11. CA→B
12. C→AB
13. CB→A

What is claimed is:

1. A dispersion compensation control apparatus for receiving an optical signal with a predetermined frequency, which is phase-modulated light applied with intensity modulation slower in the modulation speed than the phase modulation with a predetermined frequency, comprising:
a variable dispersion compensation unit, which can vary an amount of dispersion compensation, to perform dispersion compensation of the optical signal;
a clock recovery unit to extract an intensity modulation component from the received optical signal and to recover a clock from the extracted intensity modulation component;
a comparator to compare a frequency of the recovered clock with the predetermined frequency;
a demodulator to demodulate the phase modulated optical signal;
an error rate calculation unit to calculate an error rate of a demodulation result; and
a dispersion compensation amount controller, based on the comparison result, to control an amount of dispersion compensation of the variable dispersion compensation unit so that the difference in the frequency of the clock becomes small, and, after completion of reducing the difference in the frequency of the clock, to control an amount of dispersion compensation of the variable dispersion compensation unit so that the error rate becomes small.

2. The dispersion compensation control apparatus according to claim 1, wherein
the demodulator unit comprises:
an optical interferometer to demodulate the phase modulation;
an O/E converter unit to convert an output of the optical interferometer into an electrical signal; and
a phase control unit to control a phase shift that the optical interferometer provides to the optical signal so that amplitude of the O/E converted signal is maximized.

3. The dispersion compensation control apparatus according to claim 1 wherein
an adjustment of the amount of dispersion compensation for reducing the difference from the frequency of the clock is rougher than an adjustment of the amount of dispersion compensation for reducing the error rate.

4. The dispersion compensation control apparatus according to claim 1, wherein
the phase modulation is differential 2n-ary phase modulation where n is a natural number.

5. The dispersion compensation control apparatus according to claim 4, wherein the optical interferometer is a delay interferometer comprising:
a splitter to split an input optical signal into two;
a delay unit to delay one of the split optical signals for 1 bit;
a phase shifter to provide a phase shift to another one of the split optical signals; and
an interference unit to interfere the output of the delay unit and the output of the phase shifter.

6. The dispersion compensation control apparatus according to claim 1, wherein
the comparator comprises a phase locked loop to perform comparison.

7. The dispersion compensation control apparatus according to claim 2, wherein
the dispersion compensation performed so as to reduce the difference in the clock frequencies is performed first, phase control is performed next, and the dispersion compensation performed so as to reduce the error rate is performed last.

8. The dispersion compensation control apparatus according to claim 2, wherein
the dispersion compensation performed so as to reduce the difference in the clock frequencies and the phase control are performed simultaneously, and the dispersion compensation performed so as to reduce the error rate is performed last.

9. The dispersion compensation control apparatus according to claim 1, wherein
the dispersion compensation control apparatus operates during the operation of a communication system.

10. The dispersion compensation control apparatus according to claim 1, wherein
the intensity-modulated signal is a sine-wave signal.

11. The dispersion compensation control apparatus according to claim 1, wherein
a control is performed so that difference between the recovered clock frequency and the predetermined intensity-modulated frequency becomes 0.

* * * * *